United States Patent [19]

Green et al.

[11] Patent Number: 4,772,412

[45] Date of Patent: Sep. 20, 1988

[54] NON-AQUEOUS LIQUID DETERGENT COMPOSITION COMPRISING PERBORATE ANHYDROUS

[75] Inventors: Robin J. Green, Voorschoten; Arie van der Linden, Spijkenisse; Michael Bazley, Maassluis, all of Netherlands

[73] Assignee: Lever Brothers Company, New York, N.Y.

[21] Appl. No.: 910,547

[22] Filed: Sep. 23, 1986

[30] Foreign Application Priority Data

Sep. 30, 1985 [GB] United Kingdom ............... 8524064
Dec. 23, 1985 [GB] United Kingdom ............... 8531653

[51] Int. Cl.$^4$ ............................................. C11D 7/18
[52] U.S. Cl. ................................... 252/96; 252/95; 252/102; 252/186.38; 252/186.43; 252/DIG. 14; 252/135
[58] Field of Search ................. 252/95, 96, 99, 102, 252/186.3, 186.38, 186.43, 135

[56] References Cited

U.S. PATENT DOCUMENTS

| | | | |
|---|---|---|---|
| 2,864,770 | 12/1958 | McCune et al. | 252/309 |
| 2,940,938 | 6/1960 | Blinka | 252/539 |
| 3,368,977 | 2/1968 | Tuvell | 252/539 |
| 3,850,831 | 11/1974 | Hellsten et al. | 252/99 |
| 3,956,159 | 5/1976 | Jones | 252/104 |
| 4,316,812 | 2/1982 | Hancock | 252/99 |
| 4,326,979 | 4/1982 | Bus et al. | 252/158 |
| 4,518,520 | 5/1985 | Eoga | 252/174.23 |
| 4,539,131 | 9/1985 | Garner-Gray | 252/99 |

FOREIGN PATENT DOCUMENTS

| | | |
|---|---|---|
| 28849 | 9/1983 | European Pat. Off. . |
| 120659 | 10/1984 | European Pat. Off. . |
| 53859 | 4/1985 | European Pat. Off. . |
| 2233771 | 2/1973 | Fed. Rep. of Germany . |
| 1205711 | 9/1970 | United Kingdom . |
| 1270040 | 9/1970 | United Kingdom . |
| 1292352 | 10/1972 | United Kingdom . |
| 1370377 | 10/1974 | United Kingdom . |

OTHER PUBLICATIONS

"Ullmann's Encykopadie der technischen Chemie", 4th Ed. 1979, Verlag Chemie, vol. 17, p. 718.
"Interox Chemicals Bulletin".
"Deborox OP 5 Bulletin".

Primary Examiner—Prince E. Willis
Attorney, Agent, or Firm—Milton L. Honig; James J. Farrell

[57] ABSTRACT

New grade of sodium perborate anhydrous obtained from dehydration of sodium perborate monohydrate, wherein the ratio by weight of sodium perborate monohydrate to sodium oxoborate is at least 1.5:1, method of manufacturing and use thereof in detergent compositions are disclosed. The new grade of sodium perborate anhydrous is particularly suitable for use in non-aqueous liquid detergent compositions to improve dispensing behavior without impairing the chemical stability of formulations comprising a peroxy acid bleach precursor, especially N,N,N',N'-tetraacetyl ethylene diamine.

8 Claims, No Drawings

NON-AQUEOUS LIQUID DETERGENT COMPOSITION COMPRISING PERBORATE ANHYDROUS

This invention relates to perborate anhydrous and use thereof in detergent compositions. More particularly the invention relates to non-aqueous liquid detergent compositions comprising perborate anhydrous.

The term "liquid" used herein encompasses pourable liquid to paste-like or gel-type and semi-solid products.

Non-aqueous liquid detergent compositions including paste-like or gelatinous detergent compositions are known in the art and various formulations have been proposed in quite a number of patent publications, e.g. in U.S. Pat. Nos. 2,864,770; 2,940,938; 3,368,977; GB-A-Nos. 1,205,711; 1,270,040; 1,292,352; 1,370,377; DE-A-No. 2 233 771 and EP-B- 0028849.

Non-aqueous liquid detergent compositions have several advantages over aqueous liquid detergent systems. One major advantage is the "dry" environment which makes it possible to incorporate peroxide bleaching agents, such as sodium perborates, sodium percarbonates, sodium persilicates and sodium perphosphates, without special precautions for avoiding contact with water, as is the case with aqueous systems.

Non-aqueous liquid detergent compositions containing a bleaching agent have also been proposed. GB-A-No. 1,205,711, GB-A-No. 1,292,352 and DE-A-No. 2 233 771 disclose the use of peroxide bleaching agents, particularly the alkali metal perborates, in non-aqueous liquid detergent compositions.

All non-aqueous liquid detergent compositions of the art generally comprise a non-aqueous liquid medium with or without a solid phase dispersed therein. The non-aqueous liquid medium may be a liquid surfactant, preferably a liquid nonionic surfactant; a non-polar liquid medium, e.g. liquid paraffin; a polar solvent, e.g. polyols such as glycerol, sorbitol, ethylene glycol, optionally combined with low molecular monohydric alcohols, e.g. ethanol or isopropanol; or mixtures thereof.

The solid phase can be builders, alkalis, abrasives, polymers, clays, other solid ionic surfactants, bleaches, enzymes, fluorescent agents and other usual solid detergent ingredients.

However, they all suffer from one general drawback of poor dispersibility or dispensibility, which especially in washing machine operations can lead to high mechanical loss with consequently inadequate performance. Various proposals have been made to improve the rate of dissolution or dispersion, but so far without great success to give a totally adequate dispensing in washing machines with low mechanical loss figures.

A major improvement in the dispensing behaviour can be obtained by the addition of an alkali metal perborate anhydrous, particularly sodium perborate anhydrous, which is being preferred for its commercial availability.

The use of sodium perborate (anhydrous) in non-aqueous liquid built detergent compositions is disclosed in GB-A-No. 1,205,711, page 2, line 101, and page 5, Examples XIV(A) and (B), though no further details are given of what is exactly meant by sodium perborate (anhydrous) and nothing is said about the improved dispersibility.

The term "sodium perborate anhydrous" used here is meant to indicate the product obtained from a further dehydration of sodium perborate monohydrate by a heat treatment under vacuum or with hot and/or dry air. The preparation of sodium perborate anhydrous, also known as "oxoborate", is described in Ullmann's Encyklopädie der technischen Chemie, 4th Ed. 1979, Verlag Chemie, Vol. 17, page 718, and also in EP-B-No. 0053859, page 3, lines 15–20.

The degree of conversion from sodium perborate monohydrate to the anhydrous material will depend upon the temperature of heating, vacuum applied or air moisture content, and the time of the heat treatment.

In the further description of this invention the term "sodium oxoborate" is used to denote the true anhydrous material which on contact with water releases nonreactive gaseous molecular oxygen, termed as developable oxygen, as distinct from active or available oxygen used to indicate reactive oxygen released by peroxide compound bleaches, e.g. sodium perborate mono- or tetrahydrate.

As already explained before, sodium perborate anhydrous is known in the art. The material as available and presented in the art generally comprises a mixture of sodium oxoborate and sodium perborate monohydrate and contains a major proportion of sodium oxoborate which causes the material to effervesce on contact with water. The material has found use, for example, as a constituent of denture cleanser tablets.

Though sodium perborate anhydrous as available on the market is quite suitable for giving substantial improvement in the dispensing behaviour of non-aqueous liquid detergent compositions leading to very low mechanical loss figures, it was observed that when a bleach activator, i.e. a peroxyacid bleach precursor, is incorporated it has a negative influence on the chemical stability of the peroxyacid bleach precursor, thereby decreasing the bleach efficiency.

The use of peroxyacid bleach precursors, such as N,N,N',N'-tetraacetylethylenediamine (TAED) is currently becoming common practice in the formulation of detergent compositions to provide a low-temperature bleach performance. Sodium perborate anhydrous as known in the art is therefore unsuitable for use in formulations containing a peroxyacid bleach precursor.

Further research has revealed that the destabilisation effect is connected with the oxoborate/monohydrate ratio in the sodium perborate anhydrous material used.

It has now surprisingly been found that the dispensing behaviour of non-aqueous liquid detergent compositions can be substantially improved with substantially no risk of impairing the chemical stability of formulations containing a peroxyacid bleach precursor by using a new grade of sodium perborate anhydrous in which the sodium perborate monohydrate/sodium oxoborate ratio by weight is at least 1.5:1, preferably at least 2:1. This new grade must be achieved by dehydration of the sodium perborate monohydrate to within these limits of specification. Post mixing of sodium perborate monohydrate with excessively dehydrated material gives poor peroxyacid bleach precursor stability.

The higher the weight ratio of monohydrate/oxoborate is in the perborate anhydrous material, the less will be the risk involved of destabilisation of peroxyacid bleach precursors. There is no upper limit for said ratio other than for practical reasons, and ratios of up to about 30:1 or above can still be used in practice to achieve the desired properties of good dispersibility behaviour, so long as there is sufficient oxoborate in the formulation.

It has been established that from the heat-drying process to dehydrate sodium perborate monohydrate ($NaBO_2 \cdot H_2O_2$), not only sodium oxoborate is produced but also by-products of undefined nature which do not release either active oxygen or developable oxygen on contact with water.

The further the dehydration process proceeds, the more of these by-products are produced. Without wishing to be bound to any theory, it is believed that the presence of these by-products in the formulation may be the cause of the destabilisation effect, especially on peroxyacid bleach precursors.

Seemingly, the quantity of these by-products in the formulation is not primarily responsible for the destabilisaton of peroxyacid bleach precursors, but rather the quality thereof. This is clear from the fact that the presence of by-products in sodium perborate anhydrous having a monohydrate/oxoborate ratio of more than 1.5:1 does not cause substantial destabilisation, whereas a significant destabilisation effect is observed in the presence of the same amount of by-products from sodium perborate anhydrous having lower monohydrate/oxoborate ratios. Apparently other by-products reactive to peroxyacid bleach precursors are formed when the dehydration process proceeds to a stage of more than 40% conversion.

The proportions of perborate monohydrate and oxoborate in the sodium perborate anhydrous material can be analysed from its active or available oxygen content (equivalent to monohydrate) and its developable oxygen content (equivalent to oxoborate).

It should be appreciated that the destabilisation effect of sodium perborate anhydrous on bleach precursors is not bound to the physical form of the detergent composition. Hence, the sodium perborate anhydrous as defined in the present invention will also be of advantage for use in substantially dry solid and/or particulate detergent compositions, particularly when a peroxyacid bleach precursor is incorporated.

Accordingly, the invention provides a new grade of sodium perborate anhydrous obtained from dehydration of sodium perborate monohydrate, wherein the ratio by weight of sodium perborate monohydrate to sodium oxoborate is at least 1.5:1.

A convenient method of preparing the new grade of sodium perborate anhydrous is by treating the sodium perborate monohydrate with hot air in a fluidised bed.

It has been found that an excellent quality of sodium perborate anhydrous having an oxoborate content of between 12% and 15% by weight, and by-products at a level of less than 10% by weight can be obtained by using an air inlet temperature of not more than 120° C. and a bed temperature of from 110° C. to 114° C. and utilizing a treatment time from about 3 hours at a bed temperature of 110° C. to about 0.75 hour at a bed temperature of 114° C.

The sodium perborate monohydrate in the process of the invention is fluidised and heated up with the hot air until the bed temperature reaches to above 110° C. but not more than 114° C.; the dehydration process is stopped by blowing in cool air in replacement of the hot air to effect a bed temperature drop. The treatment time is the time measured during which the bed temperature is at or above 110° C.

A bed temperature of below 110° C. is unsuitable since the time required to arrive at the desired conversion would be too long, and a bed temperature of higher than 114° C. would produce a sodium perborate anhydrous quality with by-products at levels of more than 10% by weight.

A preferred process condition is that whereby the air inlet temperature is from 118°–120° C., the bed temperature is about 113–114° C. and the treatment time is about one hour at 113° C. bed temperature to 0.75 hour at a bed temperature of 114° C.

The following sodium perborate anhydrous products were obtained:

|  | Bed temperature (°C.) | | | | | |
| --- | --- | --- | --- | --- | --- | --- |
|  | 111 | 112 | 113 | 113 | 113.5 | 114 |
|  | Treatment time (hr) | | | | | |
|  | 2.3 | 1.45 | 1.1 | 1.0 | 0.8 | 0.9 |
| monohydrate % | 77.7 | 82.7 | 77.9 | 78.8 | 78.9 | 81.6 |
| oxoborate % | 14.8 | 9.4 | 14.5 | 12.8 | 12.5 | 12.3 |
| by-products % | 7.5 | 7.9 | 7.6 | 8.4 | 8.6 | 7.1 |
| Monohydrate/oxoborate ratio | 5.25 | 8.8 | 5.4 | 6.15 | 6.3 | 6.6 |

The invention therefore also provides a process for preparing said new grade of sodium perborate anhydrous by treating sodium perborate monohydrate with hot air in a fluidised bed using air at an inlet temperature of not more than 120° C., keeping the bed temperature at or above 110° C. but not more than 114° C. and utilizing a treatment time from about 3 hours at a bed temperature of 110° C. to about 0.75 hour at a bed temperature of 114° C.

The invention further provides an improved bleach-containing non-aqueous liquid detergent composition comprising a non-aqueous liquid phase and a new grade of sodium perborate anhydrous obtained from dehydration of sodium perborate monohydrate having a monohydrate/oxoborate ratio by weight of at least 1.5:1.

The non-aqueous liquid detergent composition of the invention preferably also contains a peroxyacid bleach precursor.

A marked improvement of the dispersibility can already be obtained with as low a level as 0.25% by weight of sodium oxoborate in the formulation. Increasing the oxoborate level will give an improvement up to a point where the further improvement is relatively small in proportion to the oxoborate content.

In view of this, an oxoborate level of about 10% by weight can be taken as the practical maximum level.

A preferred oxoborate level is from 1 to 5% by weight, particularly about 2% by weight.

The amount of sodium perborate monohydrate in the formulation to arrive at a satisfactory bleaching effect will be from about 5 to 30% by weight of the composition. If a peroxyacid bleach precursor is present, which is preferable, said amount will generally be lower, i.e. about 5 to 20% by weight of the composition.

In formulating the detergent composition of the invention, the amount of new grade sodium perborate anhydrous incorporated therein will depend upon the monohydrate/oxoborate ratio and should be adjusted to meet the above requirements, if necessary by adding an extra amount of sodium perborate monohydrate or a mixture of sodium perborate monohydrate and tetrahydrate.

Preferred sodium perborate anhydrous of the invention will have a monohydrate/oxoborate ratio of between 2:1 and 15:1.

Though the invention is mainly described and explained with respect to sodium perborate anhydrous, other alkali metal perborate anhydrous may as well be usable. Also, it should be appreciated that the new grade of sodium perborate anhydrous can be advantageously used in solid and/or particulate detergent compositions.

The non-aqueous liquid detergent composition of the present invention will generally comprise from 15 to about 90% by weight of a non-aqueous liquid phase, from 5 to 35% by weight of sodium perborate anhydrous as defined hereinbefore, from 0 to 20%, preferably 1–20% by weight of a peroxyacid bleach precursor and from 0 to 75%, preferably 5–75% by weight of other solid constituents, including builders, alkaline agents, abrasives, polymers, clays, inorganic carriers, structurants, enzymes, colouring agents, fluorescers, bactericides, soil-suspending agents, sequestering agents and other usual detergent ingredients, all ingredients being substantially free from water.

The detergent composition of the invention can be presented in the form of a built or an unbuilt pourable liquid, a paste-like or gelatinous product, or a semisolid product.

Depending on its form and formulation, the composition of the invention can find its use in a wide field of applications, such as:
(i) Heavy- and light-duty liquid compositions for fabric washing.
(ii) liquid abrasive cleaners for hard surfaces.
(iii) Pastes for direct application to stains, where the presence of oxoborate can cause a temperature rise effect on the cloth when water is added.
(iv) Machine dishwashing creams.

The technique of formulating and of manufacturing non-aqueous liquid detergent compositions are known in the art. The aforementioned listing of patent literature on this art exemplifies the many varieties of formulations and techniques in the art of non-aqueous liquid detergent compositions which the skilled artisan can easily choose as a basis for the composition of the present invention.

Suitable materials forming the non-aqueous liquid phase include polar compounds such as liquid detergent surfactants; polyols (e.g. glycerol, sorbitol, ethylene glycol and low molecular weight polyethylene glycols) and low molecular weight alcohols (e.g. ethanol, isopropanol), as well as non-polar compounds such as liquid paraffins.

Other liquid solvents which may be usable as more or less suitable non-aqueous liquid medium are further: Benzyl alcohol; terpene and terpene derivatives (e.g. limonene); phthalate esters (e.g. dibutyl phthalate); natural oils, such as nut oil, vegetable oils, fish oil, castor oil, amines, such as mono-, di- and triethanol amines; hydrocarbons (e.g. Shellsol T, benzene, toluene); dioxane; dimethyl formamide; and glycerol triacetate and other liquid esters. These solvents may be used individually or in admixture with other solvent materials.

Particularly suitable liquid detergent surfactants are nonionic surfactants that are liquid at room temperature.

Nonionic detergent surfactants are well known in the art. They normally consist of a water-solubilising polyoxyalkylene group in chemical combination with an organic hydrophobic group derived, for example, from alkylphenols in which the alkyl group contains from about 6 to about 12 carbon atoms, dialkylphenols in which each alkyl group contains from 6 to 12 carbon atoms, primary, secondary or tertiary aliphatic alcohols having from 8 to 20 carbon atoms, monocarboxylic acids having from 10 to about 24 carbon atoms in the alkyl group, polyoxypropylene, fatty acid mono- and dialkylol amides in which the alkyl group of the fatty acid radical contains from 10 to about 20 carbon atoms and the alkylol group is a lower alkylol group having from 1 to 3 carbon atoms, and ethoxylated derivatives thereof, for example tallow fatty acid amide condensed with 20 moles of ethylene oxide. The nonionic detergent surfactants normally have molecular weights of from about 300 to about 11,000.

Mixtures of different nonionic detergent surfactants may also be used, provided the mixtures are liquid at room temperature. Mixtures of nonionic detergent surfactants with other detergent surfactants such as anionic, cationic and ampholytic detergent surfactants and soaps may also be used, but again such mixtures must be water-free and liquid, paste-like or gel-like at room temperatures.

Examples of suitable anionic detergent surfactants are alkali metal, ammonium or alkylolamine salts of alkyl benzene sulphonates having from 10 to 18 carbon atoms in the alkyl group, alkyl and alkylether sulphates having from 10 to 24 carbon atoms in the alkyl group and from 1 to 5 ethylene oxide groups, olefin sulphonates separated by sulphonation of $C_{10}$–$C_{12}$ alpha-olefins and subsequent neutralisation and hydrolysis of the sulphonation reaction product. Examples of cationic detergent surfactants are aliphatic or aromatic higher alkyl di-(lower alkyl) ammonium halides, and examples of soaps are liquid alkali metal salts of $C_{12}$–$C_{24}$ fatty acids.

The builder salt which may be present in the composition of the invention may be any suitable organic and/or inorganic builder salts. Typical examples thereof are the alkali metal ortho-, pyro-, meta- and tri-polyphosphates, alkali metal carbonates, silicates, sodium aluminosilicates (e.g. zeolites), polyacetal-carboxylates, sodium carboxymethyloxy succinate, sodium carboxymethyloxy malonates, sodium citrate, salts of aminopolycarboxylic acids such as NTA and EDTA, etc.

The peroxyacid bleach precursors which can be used in the present invention are known in the art. They are generally organic compounds which contain N-acyl or O-acyl residues in the molecule and which exert their activating action on peroxide compounds such as perborate by reacting with said peroxide compound in aqueous solutions with the formation of peroxyacids.

Many types and classes of peroxyacid bleach precursors have been described in literature and any of these types and classes can be suitably incorporated in the detergent compositions of the invention. Typical examples thereof are disclosed in U.S. Pat. No. 3,117,148, GB patent No. 907,356, GB patent No. 836,988, GB patent No. 970,950 and U.S. Pat. No. 4,412,934.

A representative but by no means comprehensive list of known peroxy acid bleach precursors is:
(1) Acyl organoamides of the formula $RCONR_1R_2$, where RCO is a carboxylic acyl radical, $R_1$ is an acyl radical, and $R_2$ is an organic radical, as disclosed in U.S. Pat. No. 3,117,148. Examples of peroxyacid precursor compounds falling under this group are:
  (a) N,N-diacetylaniline and N-acetylphthalimide;
  (b) N-acylhydantoins, such as N,N′-diacetyl-5,5-dimethylhydantoin;

(c) Polyacylated alkylene diamines, such as N,N,N',N'-tetraacetyl ethylene diamine (TAED) and N,N,N',N'-tetraacetyl methylene diamine (TAMD) as disclosed in British patent No. 907,356;

(d) Acylated glucolurils, such as tetaacetyl glucoluril (TAGU) as disclosed in British patent No. 1,246,338;

(e) alpha-Acyloxy-(N,N')-polyacyl malonamides, such as alpha-acetoxy-(N,N')-diacetyl malonamide as disclosed in U.S. Pat. No. 3,183,266.

(2) Carboxylic esters of the type as disclosed in British patent No. 836,988. Examples of activators of this type include phenyl acetate, sodium acetoxy benzene sulphonate, trichloroethylacetate, sorbitol hexaacetate, fructose-pentaacetate, p-nitrobenzaldehyde diacetate, isopropenyl acetate, acetyl aceto hydroxamic acid, and acetyl salicylic acid. Other examples are esters of a phenol or substituted phenol with an alpha-chlorinated lower aliphatic carboxylic acid, such as chloroacetyl phenol and chloroacetylsalicylic acid, as disclosed in U.S. Pat. No. 3,130,165.

(3) Acyl-cyanurates, such as triacetyl or tribenzoyl cyanurates, as disclosed in U.S. Pat. No. 3,332,882.

(4) Carbonic acid or pyrocarbonic acid esters of the formula $R_1OCOOR_2$ or $R_3OCO-OCO-OR_2$, as disclosed in British patent No. 970,950, for example p-carboxy-phenyl-ethyl-carbonic acid ester, p-cabboxyphenyl-ethyl-pyrocarbonic acid ester, and sodium sulpho phenylethyl carbonic acid ester.

(5) Optionally substituted anhydrides of benzoic or phthalic acid, for example benzoic anhydride, m-chlorobenzoic anhydride and phthalic anhydride.

(6) Other and similar peroxyacid precursors are disclosed in EP-A-Nos. 00 98 021; EP-A- 01 06 584; EP-A- .1 06 634, P-A-01 18 304..EP-A-01 20 591; BD-A- 01 50 532; EP-A- 01 63 331; EP-A- 01 74 132 and U.S. Pat. No. 4,283,301.

One preferred peroxyacid bleach precursor is N,N,N',N'-tetraacetylethylene diamine (TAED).

Other ingredients commonly incorporated in liquid or solid detergent compositions may also be present as desired, such as hydrotropes, enzymes, enzyme-stabilising agents, fluorescers, peroxide stabilisers, soil-suspending agents, abrasives (e.g. calcite or silica), suspension stabilisers, anti-soil redeposition agents, perfumes, bactericides, corrosion inhibitors, foam boosters, foam depressors, fabric-softening agents, pH regulators, as well as other bleaching agents, all without substantially modifying the fundamental characteristics of the composition of the invention.

There is no critical range of the viscosity of the liquid detergent composition of the invention, and the consistency thereof can be adjusted at will by selecting the type and amount of the liquid components as well as of the type and amount of the solid components, a technique which is familiar to the skilled artisan.

The invention will now be illustrated by way of the following Examples.

EXAMPLES I-VI

| The following non aqueous liquid detergent compositions were prepared using different grades of sodium perborate anhydrous: | | | | | | | | |
|---|---|---|---|---|---|---|---|---|
| | I | II | III | IV | V | VI | A | B |
| Composition (% by weight) | | | | | | | | |
| $C_{13}$-$C_{15}$ primary alcohol condensed with 7 moles of EO + PO (weight ratio EO/PO = 92:8) | 31.7 | 39.2 | 37.7 | 37.7 | 37.8 | 37.6 | 37.7 | 37.8 |
| Trioxitol = $C_2H_5(EO)_3$ | 5.0 | 5.0 | 5.0 | 5.0 | 5.0 | 5.0 | 5.0 | 5.0 |
| EDTMP* | 1.0 | 1.0 | 1.0 | 1.0 | 1.0 | 1.0 | 1.0 | 1.0 |
| Ethylene diamine tetraacetate | 0.15 | 0.15 | 0.15 | 0.15 | 0.15 | 0.15 | 0.15 | 0.15 |
| Sodium tripolyphosphate anhydrous | 30.0 | 30.0 | 30.0 | 30.0 | 30.0 | 30.0 | 30.0 | 30.0 |
| Sodium carbonate anhydrous | 6.0 | 6.0 | 6.0 | 6.0 | 6.0 | 6.0 | 6.0 | 6.0 |
| Sodium carboxymethylcellulose | 0.6 | 0.6 | 0.6 | 0.6 | 0.6 | 0.6 | 0.6 | 0.6 |
| Fluorescent agent | 0.3 | 0.3 | 0.3 | 0.3 | 0.3 | 0.3 | 0.3 | 0.3 |
| Perfume | 0.25 | 0.25 | 0.25 | 0.25 | 0.25 | 0.25 | 0.25 | 0.25 |
| Aerosil ® 380** (highly voluminous silica) | 1.0 | 1.0 | 1.0 | 1.0 | 1.0 | 1.0 | 1.0 | 1.0 |
| Sodium perborate monohydrate | — | — | 4.0 | 6.0 | 7.1 | 8.4 | 10.0 | 11.8 |
| Sodium perborate anhydrous | 20.0 | 12.5 | 10.0 | 8.0 | 6.8 | 5.7 | 4.0 | 2.1 |
| TAED (tetraacetylethylenediamine) | 4.0 | 4.0 | 4.0 | 4.0 | 4.0 | 4.0 | 4.0 | 4.0 |
| Sodium perborate anhydrous analysis (%) | | | | | | | | |
| monohydrate | 91.2 | 82.4 | 77.2 | 73.2 | 69.1 | 63.4 | 46.0 | 9.1 |
| oxoborate | 6.5 | 11.4 | 14.1 | 17.3 | 20.6 | 25.1 | 36.0 | 69.4 |
| by-products | 2.3 | 6.2 | 8.7 | 9.5 | 10.3 | 11.5 | 18.0 | 21.5 |
| Dispensing behavior | good | | | | | | | |
| TAED stability (% remaining) | | | | | | | | |
| after one week at 23° C. | 3.3 | 3.7 | 3.4 | 3.5 | 3.5 | 3.4 | 2.8 | 1.4 |
| after two weeks at 23° C. | 3.2 | 3.5 | 3.5 | 3.4 | 3.4 | 3.4 | 2.4 | — |
| after two weeks at 37° C. | 3.0 | 3.2 | 3.1 | 3.1 | 3.2 | 3.2 | — | — |

*EDTMP = Ethylene diamine tetra-(methylenephosphonate)
**Aerosil is a Registered Trade-Mark The above results clearly show that, despite the equally good dispensing behaviour, the use of sodium perborate anhydrous grade according to the invention in compositions I-VI does not cause substantial deterioration of TAED, as compared to compositions A and B outside the invention wherein a significant decrease in TAED stability is observed.

EXAMPLE VII

The following compositions within the invention were prepared:

| Non-aqueous machine dishwashing Cream compositions | VII (a) (% by weight) | VII (b) |
|---|---|---|
| $C_{13}$-$C_{15}$ primary alcohol/7(EO + PO) | 40 | 40 |
| Sodium triphosphate | 25 | 25 |
| Sodium hydroxide prills | 15 | 7.5 |
| Calcite | 10 | 15 |
| Sodium metasilicate | — | 7.5 |
| Sodium perborate anhydrous (monohydrate/oxoborate ratio 6:1) | 10 | 5 |

EXAMPLE VIII

The following non-aqueous liquid detergent compositions were prepared and subjected to dispersing and storage experiments.

| | VIII | C |
|---|---|---|
| Composition (% by weight) | | |
| C$_{13}$-C$_{15}$ primary alcohol condensed with 7 moles of EO + PO (weight ratio EO/PO = 92:8) | 42.85 | 42.85 |
| EDTMP | 1.0 | 1.0 |
| Ethylene diamine tetraacetate | 0.15 | 0.15 |
| Sodium tripolyphosphate anhydrous | 30.0 | 30.0 |
| Sodium carbonate anhydrous | 6.0 | 6.0 |
| Aerosil ® 380 | 1.0 | 1.0 |
| Sodium perborate anhydrous | 15.0 | 4.5 |
| Sodium perborate monohydrate | — | 10.5 |
| Peroxyacid or precursor | 4.0 | 4.0 |
| Sodium perborate anhydrous Analysis (%) | | |
| Monohydrate | 78.0 | 13.0 |
| Oxoborate | 14.0 | 45.0 |
| By-products | 8.0 | 42.0 |
| Dispensing behaviour | good | good |
| Peroxyacid/precursor stability After 3 weeks at 37° C. | (% left) | (% left) |
| (a) Glycerol triacetate | 90 | 65.0 |
| (b) Ethylidene heptanoate acetate | 90 | 73.0 |
| (c) Sodium 3,5,5 trimethyl hexanoyloxy benzene sulphonate | 43 | 28.0 |
| (d) Potassium monopersulphate | 90 | 70.0 |

From the above results it is clear that the compositions VIII(a)–VIII(d) containing sodium perborate anhydrous according to the invention showed improved stability of the peroxyacid or peroxyacid precursor as compared with the compositions C(a)–C(d) containing sodium perborate anhydrous outside the invention.

We claim:

1. A detergent composition comprising:
   (a) from 15 to 90% weight of a non-aqueous liquid phase selected from the group consisting of liquid detergent surfactants, polyols, low molecular weight alcohols, liquid paraffins, benzyl alcohol, terpene and terpene derivatives, phthalate esters, natural nut oil, vegetable oil, fish oil, castor oil, amines, hydrocarbons, dioxane, dimethylformamide, liquid esters and mixtures thereof;
   (b) from 5 to 35% by weight of sodium perborate anhydrous obtained from dehydration of sodium perborate monohydrate, wherein the ratio by weight of sodium perborate monohydrate to sodium oxoborate is from 1.5:1 to 15:1; and
   (c) from 1 to 20% by weight of a peroxy acid bleach precursor.

2. Detergent composition according to claim 1, wherein said peroxyacid bleach precursor is N,N,N',N'-tetraacetyl ethylene diamine.

3. Detergent composition according to claim 1, which comprises sodium oxoborate at a level of from 0.25% to 10% by weight.

4. Detergent composition according to claim 3, wherein said sodium oxoborate level is from 1% to 5% by weight.

5. Detergent composition according to claim 1, which comprises from 5% to 30% by weight of sodium perborate monohydrate.

6. Detergent composition according to claim 5, wherein said amount of sodium perborate monohydrate is from 5% to 20% by weight.

7. Detergent composition according to claim 1, wherein said non-aqueous liquid phase is a liquid detergent surfactant selected from the group of nonionic, anionic, cationic, ampholytic detergents and soap, and mixtures thereof.

8. Detergent composition according to claim 1, wherein said monohydrate/oxoborate ratio by weight is from 2:1 to 15:1.

* * * * *